(12) United States Patent
Mathieson (10) Patent No.: US 10,190,316 B2
(45) Date of Patent: *Jan. 29, 2019

(54) ONE-PIECE AND TWO-PIECE SHINGLE REPAIR PATCH

(71) Applicant: Thomas R. Mathieson, Louisville, CO (US)

(72) Inventor: Thomas R. Mathieson, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/486,665

(22) Filed: Apr. 13, 2017

(65) Prior Publication Data

US 2017/0218633 A1 Aug. 3, 2017

Related U.S. Application Data (63) Continuation-in-part of application No. 14/965,559, filed on Dec. 10, 2015, now Pat. No. 9,631,383.

(51) Int. Cl.
| | |
|---|---|
| *E04D 1/20* | (2006.01) |
| *B32B 3/06* | (2006.01) |
| *E04G 23/02* | (2006.01) |
| *F16B 15/00* | (2006.01) |

(52) U.S. Cl.
CPC ............... *E04D 1/20* (2013.01); *B32B 3/06* (2013.01); *B32B 2556/00* (2013.01); *E04G 23/0281* (2013.01); *F16B 15/00* (2013.01)

(58) Field of Classification Search
CPC ........ E04D 1/20; F16B 15/02; F16B 15/0092; F16B 15/00; B32B 3/06; B32B 2556/00
See application file for complete search history.

(56) References Cited

U.S. PATENT DOCUMENTS

| | | | | | |
|---|---|---|---|---|---|
| 1,583,163 | A | * | 5/1926 | Munro | ...................... E04D 1/28 |
| | | | | | 428/137 |
| 1,649,635 | A | | 11/1927 | Willard | |
| 2,013,332 | A | * | 9/1935 | Anderson | ................. E04B 1/66 |
| | | | | | 427/198 |
| 2,132,209 | A | * | 10/1938 | Greenlee | .................... E04D 1/26 |
| | | | | | 52/13 |

(Continued)

FOREIGN PATENT DOCUMENTS

| | | |
|---|---|---|
| JP | 02-272152 A | 11/1990 |
| JP | 2001-173623 A | 6/2001 |
| WO | 8102437 A1 | 9/1981 |

*Primary Examiner* — Jeanette E Chapman
(74) *Attorney, Agent, or Firm* — Husch Blackwell LLP (57) ABSTRACT

A shingle patch for repairing damaged asphalt shingles including a base member having a notched portion or a thin sheet of material associated with one end thereof for sliding under the existing shingle located immediately above the damaged shingle, a sealant covering at least a portion of the notched portion or thin sheet of material and the bottom surface of the base member for attaching the base member to the damaged shingle, and color granules associated with at least a portion of the top surface of the base member. A nail may be embedded in the base member to further secure the shingle patch to a damaged shingle. An additional two-piece shingle patch is provided wherein the base member is further separated into two separate parts, an upper base member and a lower base member, the lower base member including the notched portion or a thin sheet of material.

4 Claims, 6 Drawing Sheets

(56) References Cited

U.S. PATENT DOCUMENTS

| | | | |
|---|---|---|---|
| 2,421,892 A * | 6/1947 | Kirschbraun | E04D 1/26 52/420 |
| 2,576,262 A | 11/1951 | Morehead | |
| 2,674,026 A | 4/1954 | St. Palley | |
| 3,049,836 A | 8/1962 | Weissman | |
| 3,252,257 A * | 5/1966 | Forest | E04D 1/26 156/71 |
| 3,434,259 A * | 3/1969 | Le Rae | E04D 1/26 52/420 |
| 3,468,092 A | 9/1969 | Chalmers | |
| 3,484,267 A * | 12/1969 | Sadler | E04D 1/26 428/189 |
| 3,485,134 A | 12/1969 | Ott | |
| 4,010,590 A | 3/1977 | Reinke | |
| 4,195,461 A | 4/1980 | Thiis-Evensen | |
| 4,343,215 A | 8/1982 | Fuchs | |
| 4,637,191 A | 1/1987 | Smith | |
| 4,659,604 A | 4/1987 | Lambuth | |
| 4,686,808 A | 8/1987 | Triplett | |
| 4,781,508 A | 11/1988 | Schroeder et al. | |
| 4,787,188 A | 11/1988 | Murphy | |
| 4,788,807 A | 12/1988 | Whitman | |
| 4,982,543 A | 1/1991 | Boyd | |
| 5,204,148 A | 4/1993 | Alexander et al. | |
| 5,311,716 A | 5/1994 | Houssin | |
| 5,419,666 A | 5/1995 | Best | |
| 5,640,820 A * | 6/1997 | Wood | E04G 23/0203 52/100 |
| 5,669,277 A | 9/1997 | Perrone | |
| 5,800,891 A | 9/1998 | Wasitis | |
| 5,901,517 A * | 5/1999 | Stahl | E04D 1/20 52/314 |
| 5,916,103 A | 6/1999 | Roberts | |
| 6,148,578 A | 11/2000 | Nowacek et al. | |
| 6,195,951 B1 * | 3/2001 | Stahl | E04D 1/20 52/314 |
| 6,305,138 B1 * | 10/2001 | Stahl | E04D 1/20 52/314 |
| 6,701,685 B2 * | 3/2004 | Rippey | E04D 5/12 428/40.1 |
| 6,820,635 B1 * | 11/2004 | McKeague | E03L 39/04 134/166 C |
| 7,685,784 B2 * | 3/2010 | Wang | C08L 53/00 52/408 |
| 7,712,275 B2 | 5/2010 | Kelly | |
| 8,210,785 B1 | 7/2012 | Gager | |
| 8,763,337 B2 | 7/2014 | Buckwalter et al. | |
| 9,017,791 B2 * | 4/2015 | Grubka | E04D 1/20 428/136 |
| 9,206,835 B2 | 12/2015 | Mathieson | |
| 2003/0141377 A1 * | 7/2003 | Dupre | F25C 3/04 239/2.2 |
| 2004/0172908 A1 * | 9/2004 | Swann | E04D 5/12 52/518 |
| 2005/0102922 A1 * | 5/2005 | Williams | E04D 12/00 52/95 |
| 2005/0193673 A1 * | 9/2005 | Rodrigues | B32B 3/06 52/518 |
| 2006/0059825 A1 | 3/2006 | Wiercinski et al. | |
| 2006/0099370 A1 | 5/2006 | Glass | |
| 2006/0179767 A1 * | 8/2006 | Miller | B32B 3/08 52/555 |
| 2007/0199251 A1 * | 8/2007 | Sieling | E04D 1/26 52/58 |
| 2007/0199276 A1 | 8/2007 | Duque | |
| 2007/0261337 A1 | 11/2007 | Whitaker et al. | |
| 2008/0155923 A1 | 7/2008 | Teng et al. | |
| 2008/0209835 A1 | 9/2008 | Margarites | |
| 2009/0145944 A1 | 6/2009 | Shor | |
| 2010/0192509 A1 | 8/2010 | Sieling et al. | |
| 2011/0041446 A1 * | 2/2011 | Stephens | E04D 1/265 52/556 |
| 2011/0056148 A1 * | 3/2011 | Jenkins | E04B 7/22 52/90.1 |
| 2011/0289879 A1 | 12/2011 | Binkley et al. | |
| 2012/0017521 A1 * | 1/2012 | Botke | E04D 1/04 52/90.1 |
| 2013/0025224 A1 | 1/2013 | Vermilion et al. | |
| 2016/0002914 A1 * | 1/2016 | Snyder | E04B 1/625 52/309.1 |
| 2016/0024794 A1 | 1/2016 | Jenkins et al. | |
| 2017/0058528 A1 * | 3/2017 | Verhoff | E04D 1/28 |

* cited by examiner

ONE-PIECE AND TWO-PIECE SHINGLE REPAIR PATCH

CROSS-REFERENCE TO RELATED APPLICATION

This application is a continuation-in-part of application Ser. No. 14/965,559, filed Dec. 10, 2015.

BACKGROUND OF THE INVENTION

The present invention relates generally to systems and methods for repairing and sealing asphalt shingles and, more particularly, to several embodiments of a shingle patch for repairing hail damage to an asphalt shingle.

Shingled roofs are typically laid in an overlapping pattern which necessarily requires the roofer to begin laying the shingles at the lowest point of the roof and moving horizontally until one row of shingles is complete. Asphalt shingles are typically nailed to the roof along the uppermost perimeter edge and the horizontal rows progress upwardly with each asphalt shingle slightly overlapping the one below it, thereby covering the nails securing the underlying shingle. With this progression, the shingles are laid in an overlapping specific pattern and it can be seen that at certain positions on the roof, for example, at edges abutting dormers, chimneys, and at the last row of shingles at the apex of the roof, the last course of nails will not be covered by an adjacent shingle and such uncovered nails are therefore exposed to the elements. If left exposed, such uncovered nails will corrode to the point that they may lose their grip or hold on the respective shingles that they are securing to the roof structure.

Shingled roofs are also subject to a wide variety of weather-related damage including hail damage, storm damage, wind damage and the like. In the particular case of hail damage, or any other damage to a particular asphalt shingle, the present methods for replacing damaged shingles are labor-intensive, time consuming and not very cost-effective, particularly, if the damaged shingles are located in the center portion of the roof structure. Current replacement methods typically require a roofer to remove the damaged shingles. Such repair also then requires removal or at least lifting and separating surrounding shingles since shingled roofs are laid in an overlapping fashion as explained above. Because replacing individual shingles is time consuming, labor-intensive, and may even cause damage to surrounding shingles, there does exist a need for a better, less labor-intensive, and faster system for repairing damaged asphalt shingles without necessarily removing the damaged shingle.

In view of the foregoing, it will be apparent to those skilled in the art that a need exists for a shingle patch for hail damage repair of asphalt shingles. The present invention addresses this need as well as other needs which will become apparent to those skilled in the art after reading the present disclosure.

SUMMARY OF THE INVENTION

The present invention is directed to several embodiments of a shingle patch system which can be used to repair hail damage and any other shingle damage associated with asphalt shingles.

In one aspect of the present invention, several embodiments of a shingle patch are disclosed wherein the patch can be overlaid on top of a damaged asphalt shingle such as a shingle having hail damage thereby eliminating the need for totally removing the damaged shingle. One embodiment of the present shingle patch includes a patch base member having one end portion of the base member specifically structured for sliding under an existing shingle such as the shingle located immediately above the damaged shingle, whereas the opposite end portion of the present shingle patch base member includes a roof nail built into the patch itself. The top portion of the base member includes colored granules that are embedded into the patch so as to match the color of the existing damaged shingle. In this regard, the present patch can be produced in multiple colors so as to match the known existing asphalt shingle colors in the marketplace, or the patch can be manufactured on site in the field by using a pre-made patch base member as will be hereinafter further explained and thereafter affixing colored granules to the patch base member in the field so as to match the existing colors of the roof to be repaired.

A sealant is associated with the bottom portion of the shingle patch base member and with that portion of the patch base member to be inserted under the existing shingle located above the damaged shingle. This sealant is preferably heat activated and can be factory applied and is typically activated by the sun. A cellophane tape or other material can be placed over the sealant areas so as to prevent the sealant from binding to any other material during shipment and storage. The tape is removed prior to installing the shingle patch over the damaged shingle. In this regard, a technician will lift the bottom edge of the shingle that lies just one row above the damaged shingle, remove the release tape from that portion of the shingle patch that slides under the existing shingle, and then insert that portion of the shingle patch under the raised shingle. The raised shingle is then lowered onto that portion of the shingle patch and that portion of the patch will bind to the existing shingle through the sealant. Once inserted under the existing adjacent shingle, the bottom portion of the shingle patch may also seal directly to the damaged shingle via the sealant located on the bottom portion of the present patch upon removing the tape previously covering the sealant of the bottom surface. Once inserted under the existing adjacent shingle, the opposite end portion of the shingle patch housing the integrated roof nail is then nailed to the damaged shingle thereby allowing the under surface of the shingle patch to seal directly to the damaged shingle via the sealant located on the bottom portion of the present patch. Once complete, the present shingle patch will overlay the damaged shingle and will match the color scheme of the roof. Since the damaged shingle remains in place, the present shingle patch provides a double layer of protection over the damaged shingle since the damaged shingle still provides some protection to the roof structure.

In another embodiment of the present shingle patch, the patch base member again includes one end portion that slides under an existing shingle, colored granules embedded in its top surface to match the color scheme of the roof shingle to be repaired, and a sealant covering both that portion of the base member which again slides under the existing shingle as well as covering the bottom surface of the base member. In contrast to the other embodiment of the present shingle patch, this patch embodiment includes a flap portion at its opposite end portion, the flap portion being lifted so that a standard roof nail can be nailed through the corresponding mating surface of the base member into the underlying damaged shingle. In this particular embodiment, an integrated roof nail is not associated with the patch. Instead, the inner surface of the flap portion and its corresponding mating surface are likewise covered with a sealant and both surfaces are likewise covered with a cellophane tape or other release tape to prevent such mating surfaces from bonding together until required. This embodiment of the present patch is again inserted under an existing shingle located immediately above the damaged shingle and once, so inserted, the flap portion at the opposite end portion of the base member is lifted, the release tape is removed and a standard roof nail is then nailed through the mating surface of the base member located under the flap portion and through the damaged shingle located below. Once the standard roof nail is hammered into place, the flap portion is lowered such that the flap will cover the head of the standard roof nail just hammered into place. As such, the flap portion serves as a roof nail seal and completely covers the nail head thereby preventing exposure to the elements. The sealant located on the bottom surface of the shingle patch as well as on the mating flap areas and on the area that slides under the existing shingle are all preferably activated either by the sun or by other heat sources thereby bonding the shingle patch to the existing shingle, the damaged shingle and to various portions of the patch itself. Here again, this embodiment of the present shingle patch overlays the damaged shingle and provides an extra layer of protection to the roof structure.

In a separate embodiment substantially similar to the first embodiment described above, the nail integrated into the roofing patch is omitted. Instead the sealant located on the bottom surface of the base member is sufficient in and of itself to secure the shingle patch to a damaged asphalt shingle.

In yet another embodiment of the present shingle patch, the patch is made up of two separate parts and again includes no nails. The shingle patch includes each an upper base member and a lower base member. The lower base member again includes one end portion that slides under an existing shingle just above the damaged shingle in need of repair. A sealant covers both its upper surface and its bottom surface. Both surfaces are likewise covered with a cellophane tape or other release tape to prevent them from bonding together or with other materials until desired. The top portion of the upper base member again includes colored granules that are embedded into its surface so as to match the color of the existing damaged shingle. Thus, like the single patch designs, the two-piece patch can be produced in multiple colors so as to match the known existing asphalt shingle colors in the marketplace, or the patch can be manufactured on site in the field by using a pre-made patch base member as will be hereinafter further explained and thereafter affixing colored granules to the patch upper base member in the field so as to match the existing colors of the roof to be repaired. A sealant covers the lower surface of the upper base member, and a cellophane tape or other release tape is provided on the lower surface to prevent it from bonding with the lower base member until required.

This embodiment of the present patch involves inserting the lower base member under an existing shingle located immediately above the damaged shingle. In this regard, a technician will again lift the bottom edge of the shingle just one row above the damaged shingle and remove the release tape from an end portion of the upper surface of the lower base member. The end portion of the lower base member may then slide under the existing, raised shingle. The raised shingle is then lowered onto that end portion of the shingle patch and that portion of the patch will bind to the existing shingle through the sealant. Once inserted under the existing adjacent shingle, the lower base member may also seal directly to the damaged shingle via the sealant located on the bottom portion of the lower base member (after tape associated therewith is removed). Subsequently, tape may be removed from the lower surface of the upper base member and the remaining upper surface of the lower base member before overlaying the upper base member on the lower base member. Sealant on the upper surface of the lower base member not located under the shingle one row above the damaged shingle may then adhere to sealant on the lower surface of the upper base member. With the upper and lower base members adhered to one another, the two-piece shingle patch will overlay the damaged shingle and will match the color scheme of the roof. This two-piece shingle patch provides a triple layer of protection over the damaged shingle since the damaged shingle still provides some protection to the roof structure.

Other embodiments include eliminating that portion of the present shingle patch that is inserted under the existing shingle located immediately above the damaged shingle and merely abutting one end portion of the present shingle patch with the edge of the existing shingle located immediately above the damaged shingle.

The various embodiments of the present shingle patch provide an improved roof repair system for repairing and/or replacing damaged shingles due to severe weather damage such as hail and the like. These and other specific aspects and advantages of the present embodiments will be apparent to those skilled in the art after reviewing the following detailed description of the illustrative embodiments set forth below which, taken in conjunction with the accompanying drawings, disclose improved structures for the roofing industry.

DETAILED DESCRIPTION OF THE INVENTION

Several embodiments of the present invention will now be explained with reference to the accompanying drawings. It will be apparent to those skilled in the art from this disclosure that the following description of the various embodiments of the present invention is provided for illustration purposes only and not for the purpose of limiting the present invention as defined by the appended claims and their equivalents.

Figure 1:
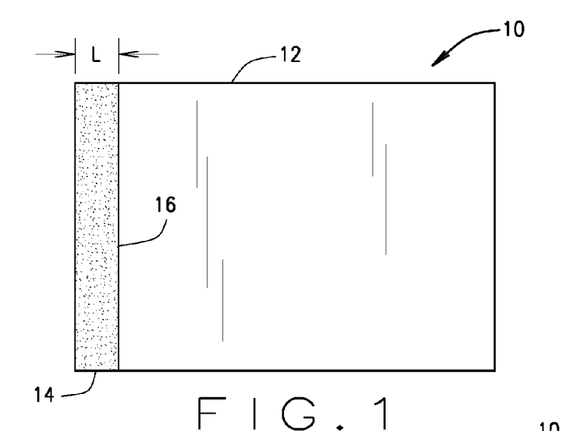
FIG. 1 is a top plan form view of one embodiment of the present shingle patch constructed in accordance with the teachings of the present invention.
Figure 2:
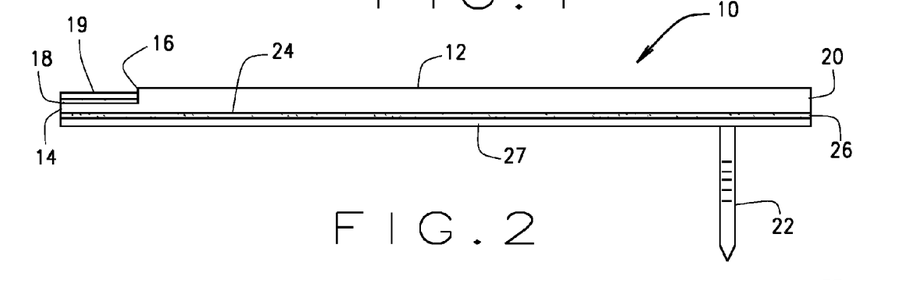
FIG. 2 is a side elevational view of the shingle patch of FIG. 1.

Referring to the drawings more particularly by reference numbers wherein like numbers refer to like parts, the number 10 in FIGS. 1 and 2 refers to one embodiment of a shingle patch used to repair damaged asphalt shingles constructed in accordance with the teachings of the present application. The shingle patch 10 includes a base member 12 sized and shaped similarly to a conventional asphalt shingle or smaller depending upon the particular application, one end portion which includes a notched portion 14 which is specifically shaped and designed for sliding under an existing shingle, such as the shingle located immediately above the damaged shingle, as will be hereinafter further explained. The notched portion 14 of base member 12 includes an overall height or thickness which is less than the overall height or thickness of the remainder of base member 12 as clearly illustrated in FIG. 2. The notched portion 14 is sized so as to be inserted under an existing shingle located immediately above the damaged shingle such that at least a portion of the existing shingle will mate with and rest on top of notched portion 14. Notched portion 14 is thinner than the remainder of base member 12 to likewise avoid creating a hump under the existing shingle when it is overlaid on top of notched portion 14. A wall or ledge portion 16 (FIG. 2) is formed between notched portion 14 and the remainder of base member 12 and functions as a stop or abutment surface for the existing shingle when overlaid on top of notched portion 14 thereby limiting the travel of the existing shingle when the notched portion 14 is inserted under the existing shingle. This arrangement also helps to prevent rain water from infiltrating under the patch 10. The overall length L of notched portion 14 can be varied depending upon the particular application and depending upon the particular size and style of asphalt shingles to be repaired.

The notched portion 14 also includes a sealant and/or adhesive 18 distributed across at least a portion of its upper surface as best illustrated in FIG. 2 for mating with and attaching to the undersurface of the existing shingle when the existing shingle is overlaid on top of notched portion 14. The sealant 18 is preferably a heat activated sealant which can be factory applied and is typically activated by the sun, although other heat sources can be applied to the notched portion 14 to activate the sealant material. Preferably, the sealant 18 covers the entire upper surface of the notched portion 14. A cellophane tape or other release material 19 can be placed over the sealant 18 so as to prevent the sealant from binding to any other material or object during shipment and storage. The tape 19 is removed prior to installing the shingle patch 10 as will be hereinafter further explained.

The opposite end portion 20 of base member 12 includes a roofing nail 22 built into the base member 12. Roofing nail 22 can be any known conventional roofing nail suitable for asphalt shingles. The roofing nail 22 is attached or integrally formed with the shingle patch base member 12 during the manufacturing process or, nail 22 can be otherwise attached to member 12 after the manufacturing process so long as nail 22 and base member 12 form a one-piece unit.

A sealant 26 is likewise associated with at least a portion of the bottom surface 24 of base member 12 as best illustrated in FIG. 2. Similar to sealant 18, sealant 26 is preferably a heat activated sealant and is likewise preferably factory applied and is typically activated by the sun. Here again, sealant 26 preferably covers the entire bottom surface 24 of base member 12. A cellophane tape or other material 27 is likewise placed over sealant 26 so as to again prevent the sealant from binding to any other material or object during shipment and storage. The tape 27 is removed prior to installing the shingle patch 10 over a damaged shingle as will be hereinafter further explained.

The top portion of base member 12 includes colored granules (not shown) that are embedded into the patch material so as to match the color of the existing damaged shingle to be repaired. In this regard, the present shingle patch 10 can be produced in multiple colors so as to match the known existing asphalt shingle colors present in the marketplace, or the base member 12 can be color-coordinated with the shingles to be repaired on-site in the field by using a pre-made shingle base member 12 with no color granules associated therewith and thereafter affixing colored granules to the member 12 in the field so as to match the existing colors of the roof to be repaired. Colored granules can be applied to any portion or the entire top surface of base member 12 in a known conventional manner using appropriate adhesives and/or other sealing materials.

Figure 3:
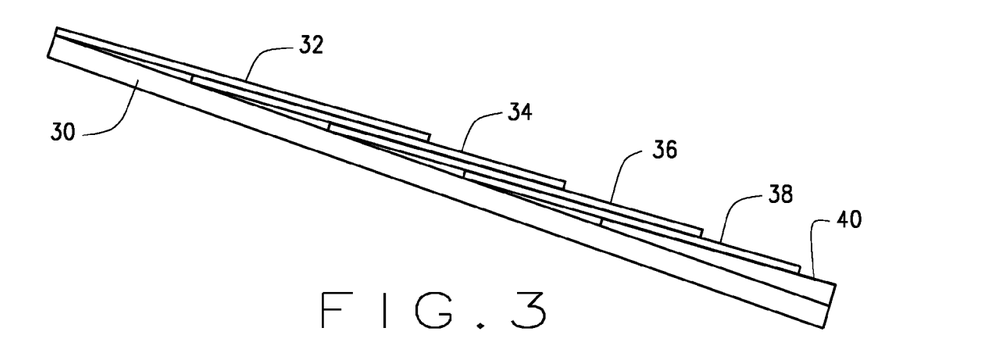
FIG. 3 is a side elevational view of a typical shingled roof showing the overlaying pattern arrangement of shingles before the present shingle patch is applied for repair.
Figure 4:
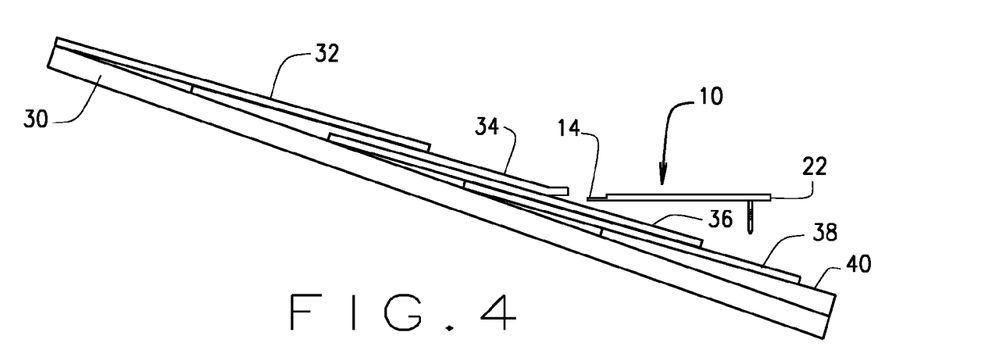
FIG. 4 is a side elevational view similar to FIG. 3 showing the present shingle patch of FIGS. 1 and 2 in exploded view prior to insertion for repair.
Figure 5:
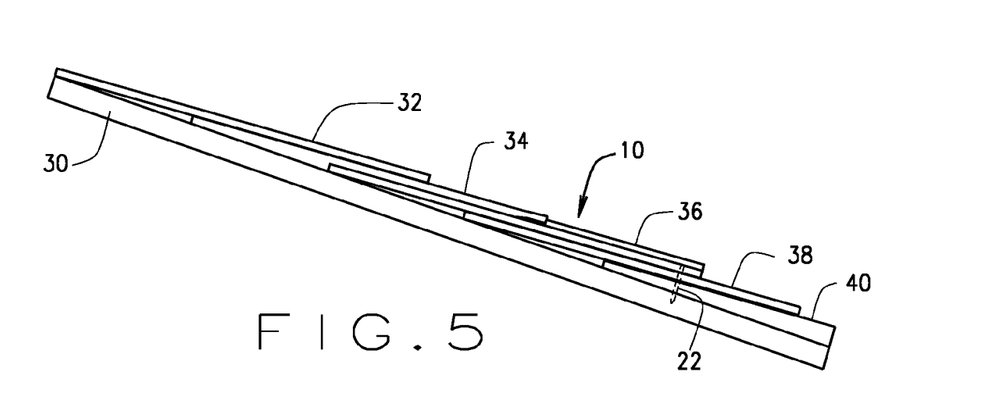
FIG. 5 is a side elevational view similar to FIG. 4 showing the present shingle patch of FIGS. 1 and 2 positioned and attached to the existing roof structure and overlaying the damaged shingle.

FIG. 3 illustrates a typical asphalt shingled roof wherein the underlying roof structure 30 is typically plywood or some other wood product. Typical asphalt shingles 32, 34, 36, 38 and 40 are overlaid in a typical overlapping pattern as illustrated in FIG. 3. Assuming that asphalt shingle 36 is damaged by hail or any other weather event, FIGS. 4 and 5 illustrate the method for repairing damaged asphalt shingle 36 using the present shingle patch 10. Repair will typically begin as illustrated in FIG. 4 where a technician will lift the bottom edge of the shingle that lies immediately above the damaged shingle. As illustrated in FIG. 4, the bottom edge of shingle 34 lies just one row above the damaged shingle 36. Lifting of the bottom edge of shingle 34 can be accomplished with known tools in the trade. Once the bottom edge of shingle 34 is lifted as illustrated, the technician will remove the release tape 19 and 27 associated with notched portion 14 and the bottom surface 24 of base member 12 respectively and then slide notched portion 14 of base member 12 under the raised portion of shingle 34. The raised shingle portion of shingle 34 is then lowered onto notched portion 14 and the heat activated or other sealant 18 associated therewith. As stated, prior to inserting notched portion 14 under the raised shingle 34, the release tape 27 associated with the bottom portion 24 of shingle patch 10 is likewise removed prior to installation.

Once notched portion 14 is inserted under the existing adjacent shingle 34, the opposite end portion 20 of base member 12 housing the integrated roofing nail 22 is then nailed to the damaged shingle 36 as best illustrated in FIG. 5. Once nailed, the undersurface of base member 12 is sealed directly to the damaged shingle 36 via the sealant 26 located across its bottom surface. Once completed, the shingle patch 10 will overlay the damaged shingle 36 as illustrated in FIG. 5 and the colored granules associated with the top surface of base member 12 will match the color scheme of the other shingles 32, 34, 36, 38 and 40 associated with the roof structure. The heat activated sealant 18 and 26 will bind to their respective mating surfaces by the heat generated from the sun if a heat activated sealant is used. Other heat sources can be used to immediately activate the sealant 18 and 26 if so desired. This could include using heat blowers, or using a different type of sealant. Since the damaged shingle 36 remains in place, the present shingle patch 10 provides an extra layer of protection since the damaged shingle 36 still provides some protection to the roof structure. Depending upon the size of the damaged area associated with shingle 36, shingle patch 10 can be sized and dimensioned so as to adequately overlay the damaged area of shingle 36. In this regard, shingle patch 10 can merely cover a portion of shingle 36 or, in other embodiments, it can cover substantially all of shingle 36 if so desired. Shingle patch 10 can be made according to any dimensions up to and including covering the entire damaged asphalt shingle.

Figure 6:
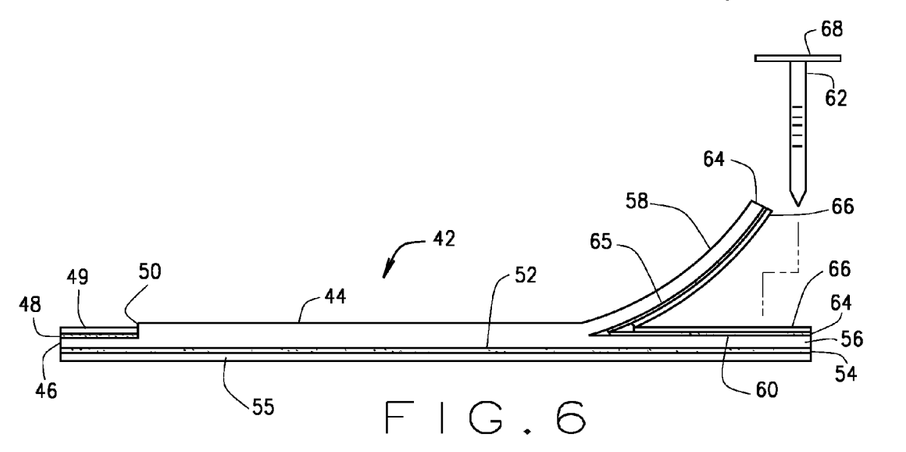
FIG. 6 is a side elevational view of another embodiment of the present shingle patch constructed in accordance with the teachings of the present invention.

FIG. 6 illustrates another embodiment 42 of the present shingle patch, namely, shingle patch 42. Patch 42 includes as a base member 44 again having a notched portion 46 associated with one end portion thereof which is constructed substantially similar to notched portion 14 associated with shingle patch 10 including having a sealant 48 covering at least a portion of the upper surface of notched portion 46 and likewise including an abutment surface, ledge or stop portion 50 for positioning and overlaying the existing adjacent shingle which will be positioned on top of notched portion 46 as previously explained. Shingle patch 42 likewise includes colored granules (not shown) embedded into its top surface to match the color scheme of the roof shingles to be repaired, and a sealant 54 covering at least a portion of the bottom surface 52 of base member 44 similar to sealant 26 associated with shingle patch 10.

Shingle patch 42 differs from shingle patch 10 in that it does not include an integrated roofing nail. Instead, the opposite end portion 56 of base member 44 includes a flap portion 58 that can be moved or lifted away from its mating surface 60 as best illustrated in FIG. 6 so that a standard roofing nail 62 can be nailed through the mating surface 60 of base member 44 into the underlying damaged shingle as will be hereinafter explained. The flap portion 58 includes a sealant 64 associated with its inner surface 65 and its mating base portion 60 can likewise optionally include a sealant 64 as well for mating with and sealing with flap portion 58. Both flap surfaces 65 and 60 covered with a sealant 64 are likewise covered with a cellophane tape or other release tape 66 so as to prevent these mating surfaces from bonding together until required. Again, sealant 64 can be a heat activated sealant. Flap portion 58 should be sufficiently large enough so as to allow a roofing technician to hammer a conventional roofing nail through base member mating surface 60 and end portion 56 so as to complete the attachment of shingle patch 42 to the damaged shingle.

Shingle patch 42 is attached overlaying a damaged shingle in a manner substantially similar to shingle patch 10 as illustrated and discussed with respect to FIGS. 3-5. In this regard, the notched portion 46 of shingle patch 42 is again inserted under an existing shingle located immediately above the damaged shingle as discussed above with respect to shingle patch 10. Here again, the release tape 49 covering sealant 48 is removed prior to insertion under the existing shingle. In similar fashion, the release tape 55 associated with sealant 54 is likewise removed prior to insertion of the notched portion 46 under the existing shingle located immediately above the damaged shingle to be repaired. Once the notched portion 46 is properly positioned, shingle patch 42 is lowered and positioned so as to overlay the damaged area of the damaged shingle and the sealant 54 associated with the bottom surface 52 of shingle patch 42 is then allowed to seal directly to the damaged shingle via the sealant 54 as previously explained. At this point, the flap portion 58 is lifted, the release tape 66 associated with both sealant surfaces 64 is removed and a standard roofing nail 62 is then nailed through the mating surface 60 of base member 44 and through the damaged shingle located below. Once the standard roofing nail 62 is hammered into place, the flap portion 58 is lowered and the sealant 64 associated with flap portion 58 and/or mating surface 60 are allowed to bond as previously explained.

Importantly, flap portion 58 covers the head 68 of roofing nail 62 and serves as a seal thereby preventing the roofing nail 62 from being exposed to the elements. Again, the respective heat activated sealants 48, 54 and 64, if used, can all be activated either by the sun or by other heat sources thereby bonding the shingle patch 42 to the existing damaged shingle, the adjacent existing shingle, and the various portions of the mating flap portion 58. Here again, shingle patch 42 overlays the damaged shingle and provides an extra layer of protection to the roof structure. The method of positioning and attaching the shingle patch 42 over a damaged shingle is substantially identical to the procedure outlined with respect to shingle patch 10 as illustrated in FIGS. 3-5 except for using a standard roofing nail 62 as explained above. Like shingle patch 10, shingle patch 42 can be sized and dimensioned as previously explained and depending upon the particular application.

Figure 7:
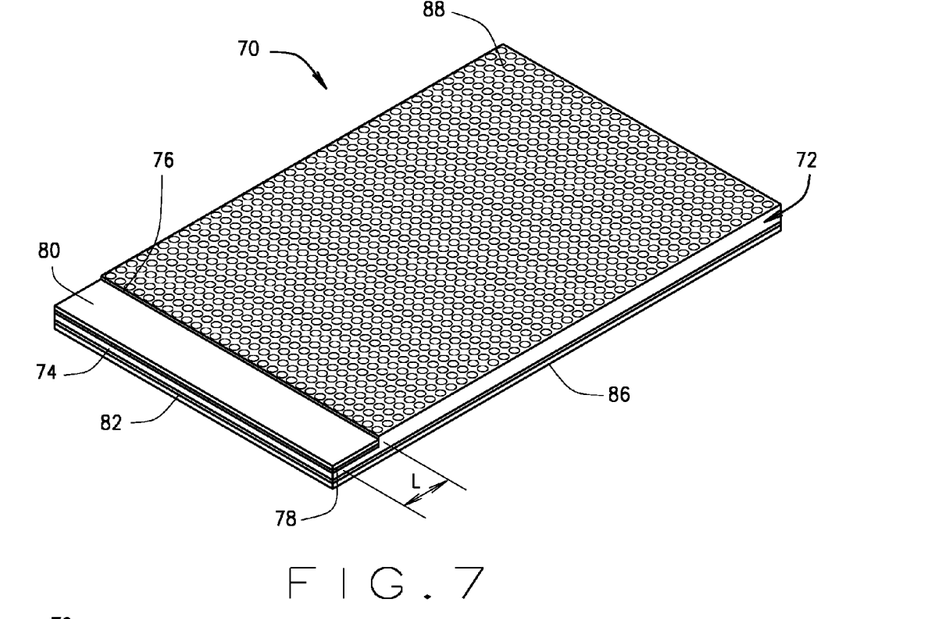
FIG. 7 is a perspective view of an alternative embodiment of the shingle patches of FIGS. 1 and 6 constructed in accordance with the teachings of the present invention.
Figure 8:
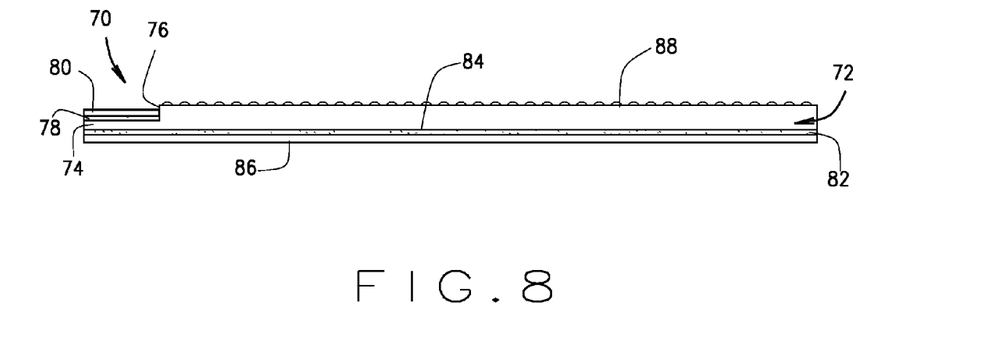
FIG. 8 is a side elevational view of the shingle patch of FIG. 7.

FIGS. 7 and 8 refer to another embodiment of a shingle patch 70 used to repair damaged asphalt shingles constructed in accordance with the teachings of the present application. The shingle patch 70 is substantially similar to the shingle patch 10 described above, though the shingle patch 70 does not include a nail like roofing nail 22 described and shown above. Like the shingle patch 10, the shingle patch 70 includes a base member 72 sized and shaped similarly to a conventional asphalt shingle or smaller depending upon the particular application. The base member 72 includes one end portion which includes a notched portion 74 specifically shaped and designed for sliding under an existing shingle, such as the shingle located immediately above the damaged shingle, as described above. The notched portion 74 of base member 72 also includes an overall height or thickness which is less than the overall height or thickness of the remainder of base member 72 as clearly illustrated in FIG. 8. The notched portion 74 is sized so as to be inserted under an existing shingle located immediately above the damaged shingle such that at least a portion of the existing shingle will mate with and rest on top of notched portion 74 in a manner substantially similar to the notched portion 14 of the shingle patch 10. Notched portion 74 is thinner than the remainder of base member 72 to likewise avoid creating a hump under the existing shingle when it is overlaid on top of notched portion 74. A wall or ledge portion 76 (FIG. 8) is formed between notched portion 74 and the remainder of base member 72 and functions as a stop or abutment surface for the existing shingle when overlaid on top of notched portion 74 thereby limiting the travel of the existing shingle when the notched portion 74 is inserted under the existing shingle. This arrangement also helps to prevent rain water from infiltrating under the patch 70. The overall length L of notched portion 74 can be varied depending upon the particular application and depending upon the particular size and style of asphalt shingles to be repaired.

The notched portion 74 also includes a sealant and/or adhesive 78 distributed across at least a portion of its upper surface as best illustrated in FIG. 8 for mating with and attaching to the undersurface of the existing shingle when the existing shingle is overlaid on top of notched portion 74. The sealant 78 is preferably a heat activated sealant which can be factory applied and is typically activated by the sun, although other heat sources can be applied to the notched portion 74 to activate the sealant material. Preferably, the sealant 78 covers the entire upper surface of the notched portion 74. A cellophane tape or other release material 80 can be placed over the sealant 78 so as to prevent the sealant from binding to any other material or object during shipment and storage. The tape 80 is removed prior to installing the shingle patch 70 as will be hereinafter further explained.

A sealant 82 is likewise associated with at least a portion of a bottom surface 84 of base member 72 as best illustrated in FIG. 8. Similar to sealant 78, sealant 82 is preferably a heat activated sealant and is likewise preferably factory applied and is typically activated by the sun or by other mechanical heat source means such as a heat blower. Here again, sealant 82 preferably covers the entire bottom surface 84 of base member 72. A cellophane tape or other material 86 is likewise placed over sealant 82 so as to again prevent the sealant from binding to any other material or object during shipment and storage. The tape 86 is removed prior to installing the shingle patch 70 over a damaged shingle as will be hereinafter further explained.

The top portion of base member 72 again includes colored granules 88 that are embedded into the patch material so as to match the color of the existing damaged shingle to be repaired. In this regard, the present shingle patch 70 can be produced in multiple colors so as to match the known existing asphalt shingle colors present in the marketplace. In an alternative embodiment such as shown for the base member 12 of the shingle patch 10, the base member 72 can be color-coordinated with the shingles to be repaired on-site in the field by using a pre-made shingle base member with no color granules associated therewith and thereafter affixing colored granules to the member 72 in the field so as to match the existing colors of the roof to be repaired. Colored granules can be applied to any portion or the entire top surface of base member 72 in a known conventional manner using appropriate adhesives and/or other sealing materials.

The shingle patch 70 may be fitted to and adhered to a damaged shingle in a manner substantially similar to that described for shingle patch 10 and shown in FIGS. 3-5 except it does not use the roofing nail 22 to nail the shingle patch 70 to the damaged shingle 36. Instead the sealant 82 on the bottom surface 84 of the base member 72 provides sufficient adhesive force to bond the shingle patch 70 to the damaged shingle 36. The roofing nail 22 is not necessary.

It is also recognized and anticipated that a factory or field applied adhesive that is aggressive enough to be applied at acceptable, ambient temperature using only sufficient downward pressure to laminate or attached the patch 70 to the existing roof can also be utilized. A small roller tool made from metal, rubber, wood or other similar material can be used to apply a concentrated pressure to the patch 70 to ensure adequate attachment. This attachment should provide a permanent waterproof bonding between the patch 70 and the existing roof. Other adhesives or sealants may also be used.

The patch 70 can be trimmed to fit the particular application at the factory, or by the installer in the field, to repair shingles of different shapes and sizes as well as lip and ridge and any other accessory products. The patch 70 is installed without nails as the adhesives alone provides the permanent and waterproof bonding together of all surfaces. The patch 70 can also be used to cover exposed nails such as those that exist as a result of headwalls, the final rows of field shingles on shed roof style roofs, on final ridge caps, and other applications.

Figure 9:
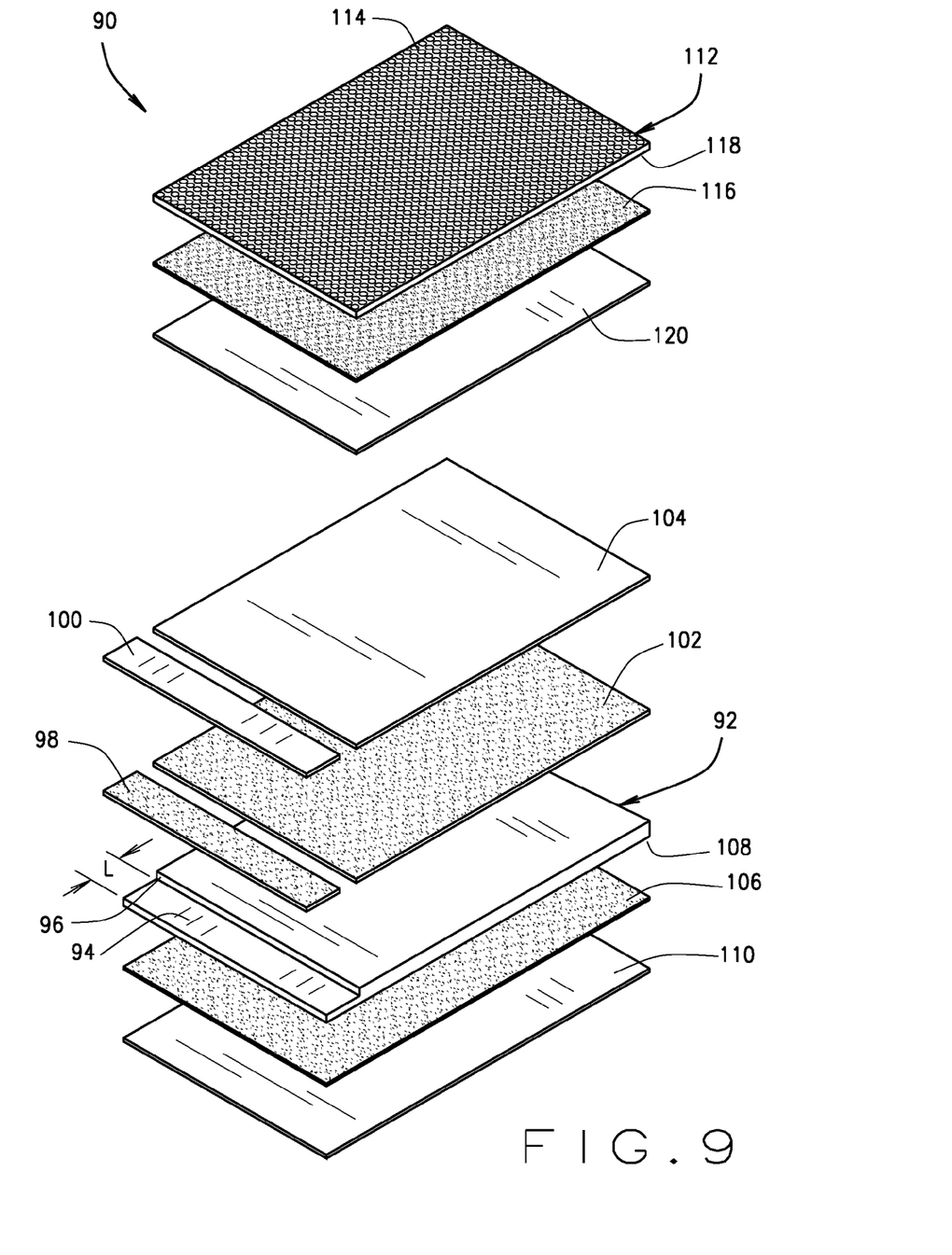
FIG. 9 is an exploded perspective view of a two-piece embodiment of the present shingle patch constructed in accordance with the teachings of the present invention.
Figure 10:
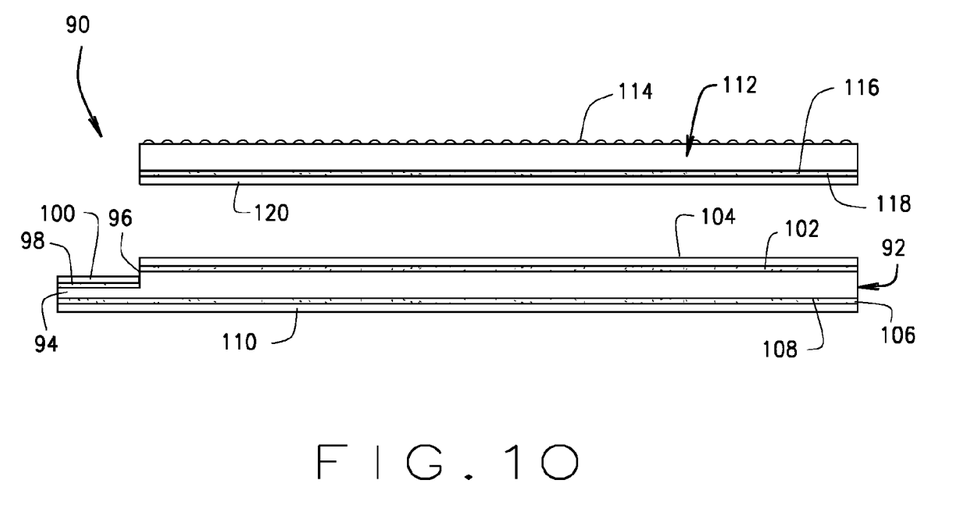
FIG. 10 is a side elevational view of the two pieces that make up the shingle patch of FIG. 9.

Turning now to FIGS. 9 and 10, yet another embodiment of a shingle patch 90 is provided that likewise is used to repair damaged asphalt shingles constructed in accordance with the teachings of the present application. The shingle patch 90, like the shingle patch 70, does not include a nail like roofing nail 22 described and shown herein in reference to the shingle patch 10. However, the shingle patch 90 does include two parts, each of which are described in detail below. The shingle patch 90 includes a lower base member 92 sized and shaped similarly to a conventional asphalt shingle or smaller depending upon the particular application. The lower base member 92 includes one end portion having a notched portion 94 specifically shaped and designed for sliding under an existing shingle, such as the shingle located immediately above the damaged shingle, as described above in relation to the other shingle patches 10, 70. The notched portion 94 of lower base member 92 also includes an overall height or thickness less than the overall height or thickness of the remainder of lower base member 92 as clearly illustrated in FIG. 10. Like the notched portion 74, the notched portion 94 is thinner than the remainder of lower base member 92 to likewise avoid creating a hump under the existing shingle when it is overlaid on top of notched portion 94. A wall or ledge portion 96 shown in FIGS. 9 and 10 is also provided that performs substantially the same function as the ledge portions associated with the shingle patches 10, 70. The ledge portion 96 limits the travel of the existing shingle when the notched portion 94 is inserted under the existing shingle. This arrangement also helps to prevent rain water from infiltrating under the patch 90. The overall length L of notched portion 94 can, like the other shingle patches 10 and 70, be varied depending upon the particular application and depending upon the particular size and style of asphalt shingles to be repaired.

The notched portion 94 also includes a sealant and/or adhesive 98 distributed across at least a portion of its upper surface as best illustrated in FIG. 9 for mating with and attaching to the undersurface of the existing shingle when the existing shingle is overlaid on top of notched portion 94. The sealant 98 is preferably a heat activated sealant which can be factory applied and is typically activated by the sun, although other heat sources can be applied to the notched portion 94 to activate the sealant material. Preferably, the sealant 98 covers the entire upper surface of the notched portion 94. A cellophane tape or other release material 100 can be placed over the sealant 98 so as to prevent the sealant from binding to any other material or object during shipment and storage. The tape 100 is removed prior to installing the shingle patch 90 as will be hereinafter further explained.

Unlike the other shingle patches 10, 70, the upper portion of the lower base member 92 not including the notched portion 94 is also provided with a sealant and/or adhesive 102 distributed across at least a portion of its upper surface (best illustrated in FIG. 9) for mating with and attaching to the undersurface of an upper base member, the structure of which is described in greater detail below. The sealant 102 is preferably heat activated like the sealant 98 and covers the entirety of the upper surface of the lower body member 92 not including the notched portion 94. A cellophane tape or other release material 104 may also be placed over the sealant 102 so as to prevent the sealant 102 from binding to any other material or object during shipment and storage. The tape 104 is removed prior to attaching to the undersurface of the upper base member, the structure of which will be hereinafter further explained.

A sealant 106 is likewise associated with at least a portion of a bottom surface 108 of lower base member 92 as best illustrated in FIG. 10. The sealant 106 is substantially similar to the sealants 98, 102 described above and preferably covers the entire bottom surface 108 of lower base member 92. A cellophane tape or other material 110 is also placed over sealant 106 so as to again prevent the sealant from binding to any other material or object during shipment and storage. The tape 110 is removed prior to installing the lower base member 92 over a damaged shingle.

The shingle patch 90 further includes an upper base member 112 that is adhered to the lower base member 92 when the shingle patch 90 is assembled. The upper base member 112 preferably is sized and shaped substantially similarly to the upper surface of the lower base member 92 not including the notched portion 94. The top portion of upper base member 112 includes colored granules 114 that are embedded into the patch material so as to match the color of the existing damaged shingle to be repaired. In this regard, the present shingle patch 90 can be produced in multiple colors so as to match the known existing asphalt shingle colors present in the marketplace. In an alternative embodiment such as shown for the base member 12 of the shingle patch 10, the upper base member 112 can be color-coordinated with the shingles to be repaired on-site in the field by using a pre-made shingle base member with no color granules associated therewith and thereafter affixing colored granules to the upper base member 112 in the field so as to match the existing colors of the roof to be repaired. Colored granules can be applied to any portion or the entire top surface of base member 112 in a known conventional manner using appropriate adhesives and/or other sealing materials.

A sealant 116 is likewise associated with at least a portion of a bottom surface 118 of upper base member 112 as best illustrated in FIG. 10. The sealant 116 is substantially similar to the sealants 98, 102, 106 described above and preferably covers the entire bottom surface 118 of upper base member 112. A cellophane tape or other material 120 is also placed below sealant 116 so as to again prevent the sealant from binding to any other material or object during shipment and storage. The tape 120 is removed prior to attaching the upper base member 112 to the lower base member 92 to install the shingle patch 90.

The shingle patch 90 is fitted and adhered to a damaged shingle in a manner somewhat different than that described for shingle patch 10 and shown in FIGS. 3-5. Once the bottom edge of shingle 34 is lifted as illustrated in FIG. 4, a technician will again remove the release tape 100 and 110 associated with notched portion 94 and the bottom surface 108 of lower base member 92, respectively, and then slide notched portion 94 of lower base member 92 under the raised portion of shingle 34. The raised shingle portion of shingle 34 is then lowered onto notched portion 94 and the heat activated or other sealant 98 associated therewith. With the release tape 110 associated with the bottom portion 108 of the lower base member 92 removed, the sealant 106 may also be adhered to the damaged shingle, thus securing the lower base member 92 to the damaged shingle. Next, the sealing tape 104 covering remaining sealant 102 located on the upper surface of lower base member 92 may be removed. The sealing tape 120 covering the sealant 116 located on the bottom surface of upper base member 112 may likewise be removed, and the upper base member 112 may be attached to the lower base member 92 by way of the bond formed between sealants 116, 102 respectively.

Now assembled, the shingle patch 90 will overlay the damaged shingle 36 as illustrated in FIG. 5 and the colored granules 114 associated with the top surface of the upper base member 112 will match the color scheme of the other shingles such as shingles 32, 34, 36, 38 and 40 associated with the roof structure. The heat activated sealants 98, 102, 106, and 116 will bind to their respective mating surfaces by the heat generated from the sun, or other mechanical heat source means, if a heat activated sealant is used. Other heat sources can be used to immediately activate the sealants if so desired (e.g., using heat blowers or a different type of sealant).

It is also recognized and anticipated that the adhesives utilized with the bottom surface 108 of the lower base member 92, the upper surface of the lower base member 92, and the bottom surface 118 of the upper base member 112 may have different options for using adhesives that will supply a permanent and waterproof bonding both between the respective base members 92 and 112 as well as between the bottom surface 108 of lower base member 92 and the damaged shingle. These various options may include, for example, a factory or field applied adhesive that can be used with any of the above referenced surfaces that is aggressive enough to be applied at acceptable, ambient temperatures using only sufficient downward pressure so as to laminate or attach both the lower base member 92 to the damaged shingle and/or bonding the respective lower and upper base members 92 and 112 together. A small roller tool made from metal, rubber, wood or other suitable materials can be used to apply a concentrated pressure to the respective base members 92 and 112 to assure adequate attachment therebetween.

Still further, it is also recognized and anticipated that a factory or field applied adhesive that is sufficiently aggressive enough to bond to adjoining surfaces such as the bottom surface 118 of upper base member 112 to the upper surface of lower base member 92 may only need be applied to one of the two respective surfaces instead of applying an adhesive to both the bottom surface of upper base member 112 and the upper surface of lower base member 92. In this situation, only one of the respective surfaces need have an adhesive associated therewith.

The two-piece patch 90 can likewise be trimmed to fit the particular application at the factory, or it can be trimmed by the installer in the field, to repair shingles of different shapes and sizes as well as hip and ridge and other accessory products. Although the two-piece patch 90 is designed to be installed without nails as the adhesives associated with patch 90 alone provide the permanent and waterproof bonding necessary between all surfaces, patch 90 can likewise be utilized with nails. If nails are to be used, they will only be used on the lower base member 92 so that the upper base member 112 will then cover and seal all of the nail heads associated with the lower base member 92. The patch 90 can also be used to cover exposed nails such as those that exist as a result of headwalls, the final rows of field shingles on shed roof style roofs, on ridge caps, and on other applications.

Figure 11:
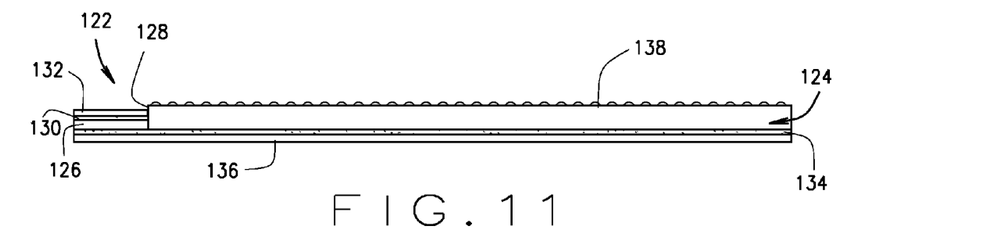
FIG. 11 is a side elevational view of still another embodiment of a shingle patch similar to the shingle patch of FIGS. 7 and 8 constructed in accordance with the teachings of the present invention.

It is also recognized and anticipated that the notched portion 74 associated with shingle patch 70 can also be formed by a very thin sheet of material such as a thin sheet of sheet metal, aluminum, copper, plastic or other suitable material which is merely attached to base member 72 via any suitable means of attachment such as a sealant, adhesive, or other attachment mechanism as best illustrated in FIG. 11. In this particular embodiment 122 (FIG. 11), shingle patch 122 is substantially similar to shingle patch 70 and includes a base member 124 having a thin sheet of material 126 associated with one end portion thereof which again is specifically shaped and designed for sliding under an existing shingle such as the shingle located immediately above the damaged shingle as described above. The sheet of material 126 can extend outwardly from one end portion of the base member 124 as illustrated in FIG. 11 or it can be overlapped with the bottom surface of the base member 124 and attached thereto in a conventional manner. The sheet of material 126 is relatively thin so that the existing shingle does not have to be lifted or separated from the roof structure nearly as much when the thin sheet of material 126 is inserted under the existing shingle located immediately above the damaged shingle as compared to inserting notch 74 under the existing shingle. This helps to preserve the seal between the existing shingle and the roof structure and further prevents leakage around the respective end portions of the existing shingle when the sheet of material 126 is inserted under such existing shingle. In all other respects, the shingle patch 122 is substantially similar to shingle patch 70 and includes a wall or lip portion 128, a sealant and/or adhesive 130 distributed across at least a portion of the upper surface of the thin sheet of material 126 for mating with and attaching to the undersurface of the existing shingle, a cellophane tape or other release material 132 placed over the sealant 130, a sealant 134 associated with at least a portion of the bottom surface of the base member 124, and a cellophane tape or other material 136 covering the sealant 134 as previously explained. The top portion of base member 124 again includes colored granules 138 that are embedded into or otherwise formed or attached to the patch material so as to match the color of the existing damaged shingle to be repaired.

Figure 12:
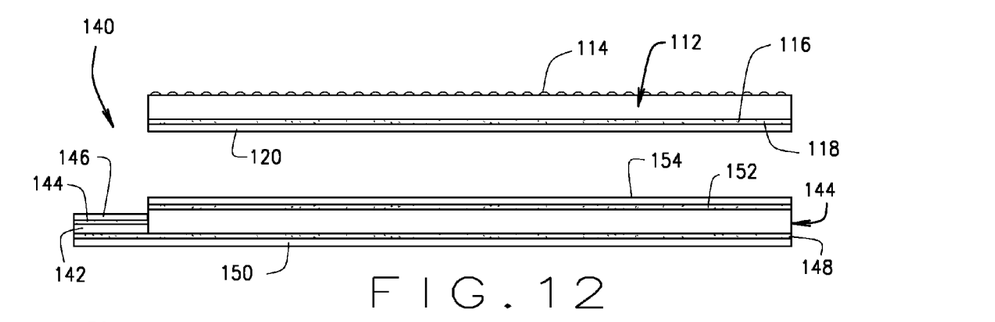
FIG. 12 is a side elevational view of still another embodiment of a two-piece shingle patch similar to the shingle patch of FIGS. 9 and 10 constructed according to the teachings of the present invention.

Use of a thin sheet of material such as the sheet of material 126 can likewise be utilized with the lower base member 92 associated with the two-piece shingle patch 90 (FIGS. 9 and 10) as again illustrated in FIG. 12. In this particular embodiment 140, the notch 94 associated with the lower base member 92 is again replaced with a very thin piece of material 142. This again can be attached to the lower base member 144 via any suitable means as explained above. Here again, the thin piece of material 142 is shaped and designed to be inserted under the existing shingle located immediately above the damaged shingle and, because the sheet of material 142 is substantially thinner than the notched portion 94, insertion of the thin sheet of material 142 under the existing shingle requires less lifting of the existing shingle and thereby requires less deterioration of the seal between the existing shingle and the roof structure. As with embodiment 90, the thin sheet of material 142 may likewise include a sealant and/or adhesive 144 distributed across at least a portion of its upper surface as best shown in FIG. 12 and it may likewise include a cellophane tape or other release material 146 placed over the sealant 144 so as to again prevent the sealant from binding to any other material or object during shipment and storage. In similar fashion, the lower base member 144 likewise includes a sealant and/or adhesive 148 distributed over at least a portion of its lower surface for attaching to the damaged shingle and it may likewise include a cellophane tape or other release material 150 placed over the sealant 148. The upper surface of lower base member 144 likewise includes a sealant and/or an adhesive 152 distributed across at least a portion of its upper surface for mating with and attaching to the undersurface of the upper base member 112 and a cellophane tape or other release material 154 may likewise cover adhesive or sealant 152. The upper base member 112 is substantially identical to the upper base member associated with the two-piece shingle patch 90 illustrated in FIG. 10.

Figure 13:
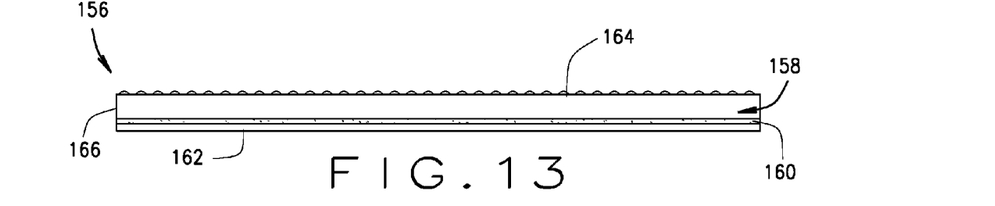
FIG. 13 is a side elevational view of yet another embodiment of a one-piece shingle patch constructed according to the teachings of the present invention.
Figure 14:
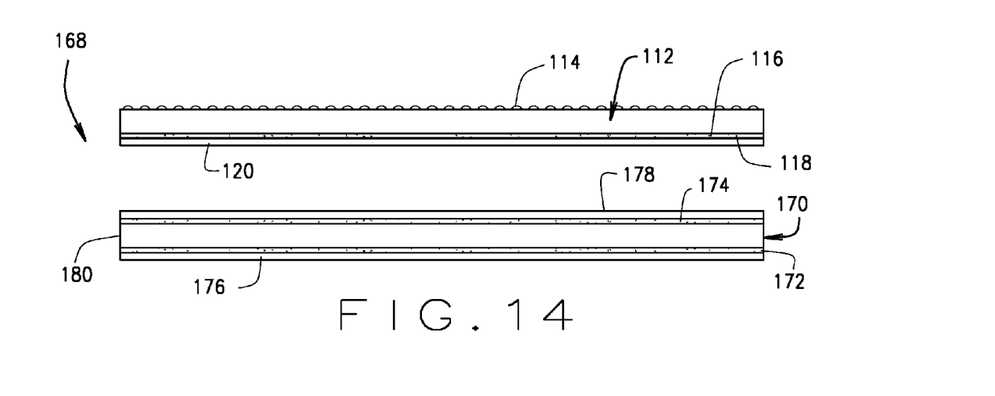
FIG. 14 is a side elevational view of yet another embodiment of a two-piece shingle patch constructed according to the teachings of the present invention.

FIGS. 13 and 14 illustrate still other embodiments of the present one-piece and two-piece shingle patch. More particularly, FIG. 13 illustrates a one-piece shingle patch 156 which is substantially similar to shingle patch 70 except that notch portion 74 has been eliminated. In this particular embodiment, the patch 156 includes a base member 158 having a sealant and/or adhesive 160 distributed across at least a portion of its lower surface for mating with and attaching to the damaged shingle and further includes a cellophane tape or other release material 162 covering the adhesive 160 for reasons as previously explained. Similar to shingle patch 70, the top surface of base member 158 likewise includes colored granules 164 that are either embedded or otherwise attached to the patch material so as to match the color of the existing damaged shingle to be repaired. In this particular embodiment, the shingle patch 156 is placed over the damaged shingle and its one end portion 166 is placed in abutting relationship to the edge portion of the existing shingle located immediately above the damaged shingle. In this embodiment, the adhesive 160 provides sufficient adhesive force to bond the shingle patch 156 to the damaged shingle and the existing shingle located immediately above the damaged shingle does not have to be lifted or otherwise separated from the roofing structure to complete the repair. Shingle patch 156 is applied directly over the damaged shingle and can be trimmed to fit the particular damaged shingle either at the factory, or by the installer in the field. Here again, the adhesive 160 provides sufficient adhesive force to bond the shingle patch 156 to the damaged shingle.

FIG. 14 illustrates a modified version 168 of the two-piece shingle patch 90 wherein again, the notched portion 94 has been eliminated from the lower base member 170. In all other respects, lower base member 170 is substantially identical to lower base member 92 and likewise includes a sealant and/or adhesive 172 and 174 covering at least a portion of its bottom and upper surfaces respectively, as well as a cellophane tape or other release material 176 and 178 which are likewise placed over the respective sealants 172 and 174 so as to prevent the sealant from binding to any other material or object during shipment and storage. The upper base member 112 is identical to base member 112 discussed above with respect to shingle patch 90. In this particular application, one end portion 180 of the lower base member 170 is again positioned in abutting relationship to the edge portion of the existing shingle located immediately above the damaged shingle and base member 170 is positioned directly over the damaged shingle. The lower base member 170 is again sized and shaped to mate with and attach to the top surface of the damaged shingle as described above. The upper base member 112 is adhered to the lower base member 170 in a similar manner as described above with respect to shingle patch 90. Here again, shingle patch 168 does not require lifting of the existing shingle located immediate above the damaged shingle and thereby helps to preserve the attachment of the existing shingle to the roof structure.

Understanding the scope of the present invention, the term "comprising" and its derivatives, as used herein, are intended to be open-ended terms that specify the presence of the stated features, elements, components and/or groups, but do not exclude the presence of other unstated features, elements, components and/or groups. The foregoing also applies to words having similar meanings such as the terms "including", "having" and their derivatives. The terms of degree such as "substantially", "about" and "approximate" as used herein mean a reasonable amount of deviation of the modified term such that the end result is not significantly changed.

Only selected embodiments have been chosen to illustrate the present inventions. The various constructions described above and illustrated in the drawings are presented by way of example only and are not intended to limit the concepts and principals of the present inventions. It is also recognized and anticipated that the size, shape, location and other orientation of the various components and/or elements associated with the present inventions can be changed as needed and/or as desired depending upon a particular application. Components that are shown directly connected or contacting each other can have intermediate structures disposed between them. In addition, the functions of one element can be performed by two elements, and vice versa. The structures and functions of one embodiment can also be adopted in another embodiment. It is not necessary for all advantages to be present in a particular embodiment at the same time. Thus, the foregoing descriptions of the embodiments according to the present inventions are provided for illustration only, and not for the purpose of limiting the inventions as defined by the appended claims and their equivalents.

Thus, there has been shown and described several embodiments of a novel shingle patch for damage repair of asphalt shingles. As is evident from the foregoing description, certain aspects of the present inventions are not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. All such changes, modifications, variations and other uses in applications which do not depart from the spirit and scope of the present inventions are deemed to be covered by the inventions which are limited only by the claims which follow.

The invention claimed is:

1. A non-metal asphalt shingle patch used for repairing a damaged portion of a damaged asphalt shingle where the damaged shingle is located immediately below an existing shingle, the shingle patch comprising:
    a single, unitary base member having top and bottom surfaces, opposed side portions and opposed end portions, the base member being sized and shaped to have straight extending opposed side portions, straight extending opposed end portion, and to overlay the damaged portion of the damaged asphalt shingle;
    a notched portion formed within said single, unitary base member located at one end portion of said base member, said notched portion being sized and shaped to be inserted under the existing shingle such that at least a portion of the existing shingle will rest on top of the notched portion;
    a sealant covering said notched portion for attaching the notched portion to the existing shingle and a sealant covering the bottom surface of said base member for attaching the base member directly to the damaged portion of the damaged asphalt shingle;
    separate color granules attached to at least a portion of the top surface of the base member; and
    a release tape overlaying the sealant covering the notched portion and the bottom surface of the base member.

2. The shingle patch defined in claim 1 wherein the base member and the notched portion include a thickness, the thickness of the notched portion being thinner than the thickness of the base member.

3. The shingle patch defined in claim 1 including a ledge formed in the base member located between the notched portion and the remainder of the base member.

4. The shingle patch defined in claim 1 wherein the sealant is a heat activated sealant.

\* \* \* \* \*